(12) United States Patent
Han et al.

(10) Patent No.: US 9,930,672 B2
(45) Date of Patent: Mar. 27, 2018

(54) SERVICE DATA SCRAMBLING METHOD, SERVICE DATA DESCRAMBLING METHOD, APPARATUS AND SYSTEM

(71) Applicant: HUAWEI TECHNOLOGIES CO., LTD., Shenzhen (CN)

(72) Inventors: Guanglin Han, Beijing (CN); Chen Chi, Shenzhen (CN); Jianguo Wang, Bonn (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 14/941,939

(22) Filed: Nov. 16, 2015

(65) Prior Publication Data
US 2016/0081094 A1   Mar. 17, 2016

Related U.S. Application Data

(63) Continuation of application No. PCT/CN2013/075793, filed on May 17, 2013.

(51) Int. Cl.
*H04W 72/04* (2009.01)
*H04L 25/03* (2006.01)
(Continued)

(52) U.S. Cl.
CPC ......... *H04W 72/0466* (2013.01); *H04L 12/18* (2013.01); *H04L 25/03866* (2013.01); *H04W 72/005* (2013.01); *H04W 72/12* (2013.01)

(58) Field of Classification Search
CPC ........... H04W 72/0466; H04W 72/005; H04W 72/12; H04L 12/18; H04L 25/03866
See application file for complete search history.

(56) References Cited

U.S. PATENT DOCUMENTS 8,126,076 B2 * 2/2012 Sartori ............... H04L 1/06
   375/130
2009/0129298 A1 * 5/2009 Luo ............... H04W 56/001
   370/280

(Continued)

FOREIGN PATENT DOCUMENTS

CN   101132296   2/2008
CN   101242290   8/2008
(Continued)

OTHER PUBLICATIONS

Extended European Search Report dated Feb. 10, 2016 in corresponding European Patent Application No. 13884933.6.
(Continued)

*Primary Examiner* — Jay P Patel
(74) *Attorney, Agent, or Firm* — Staas & Halsey LLP

(57) ABSTRACT

The present invention discloses a service data scrambling method, a service data descrambling method, an apparatus, and a system, and relates to the communications field. The service data scrambling method includes: receiving service data; using a service characteristic corresponding to the service data as a part of a scrambling parameter; generating a scrambling sequence according to the scrambling parameter; scrambling the service data according to the scrambling sequence; and sending the service data. According to the present invention, it is resolved that relatively great interference is generated when multiple pieces of different service data are simultaneously transmitted in a same service area, and achieving an effect that interference between different service data sent simultaneously in the same service area can be reduced to a great extent.

9 Claims, 7 Drawing Sheets

(51) Int. Cl.
*H04L 12/18* (2006.01)
*H04W 72/00* (2009.01)
*H04W 72/12* (2009.01)

(56) References Cited

U.S. PATENT DOCUMENTS

| | | | |
|---|---|---|---|
| 2009/0249027 A1* | 10/2009 | Kim | H04L 25/03866 |
| | | | 712/5 |
| 2010/0118992 A1 | 5/2010 | Terabe | |
| 2010/0272004 A1* | 10/2010 | Maeda | H04L 5/0007 |
| | | | 370/312 |
| 2011/0077038 A1 | 3/2011 | Montojo et al. | |
| 2012/0009923 A1 | 1/2012 | Chen et al. | |
| 2012/0176884 A1* | 7/2012 | Zhang | H04B 7/024 |
| | | | 370/203 |
| 2012/0257562 A1* | 10/2012 | Kim | H04W 4/06 |
| | | | 370/312 |
| 2014/0247799 A1* | 9/2014 | Suzuki | H04W 74/0833 |
| | | | 370/329 |
| 2015/0085785 A1* | 3/2015 | Kim | H04L 5/0092 |
| | | | 370/329 |
| 2015/0319023 A1 | 11/2015 | Luo et al. | |
| 2017/0111884 A1* | 4/2017 | Sadeghi | H04W 68/02 |

FOREIGN PATENT DOCUMENTS

| | | |
|---|---|---|
| CN | 101350690 | 1/2009 |
| CN | 101822013 | 9/2010 |
| CN | 102348164 A | 2/2012 |
| CN | 102687412 | 9/2012 |
| CN | 102687453 | 9/2012 |
| EP | 2012482 A2 | 1/2009 |
| WO | 2011/041598 A2 | 4/2011 |

OTHER PUBLICATIONS

PCT International Search Report dated Feb. 20, 2014 in corresponding International Patent Application No. PCT/CN2013/075793.
"Scrambling Code in E-UTRA Downlink", 3GPP TSG-RAN WG1 LTE Ad Hoc Meeting, R1-060036, Helsinki, Finland, Jan. 23-25, 2006, pp. 1-4.
"Scrambling Sequence Initialisation", 3GPP TSG-RAN Working Group 1 #52, Tdoc R1-080940, Sorrento, Italy, Feb. 11-15, 2008, 4 pp.
"3rd Generation Partnership Project; Technical Specification Group Radio Access Network; Evolved Universal Terrestrial Radio Access (E-UTRA); Physical Channels and Modulation (Release 11)", 3GPP TS 36.211, V11.2.0, Feb. 2013, pp. 1-109.
International Search Report dated Feb. 20, 2014, in corresponding International Application No. PCT/CN2013/075793.
Chinese Office Action dated Jul. 5, 2017 in corresponding Chinese Patent Application No. 201380003537.7, 8 pages.
Chinese Office Action dated Jan. 8, 2018 in corresponding Chinese Application Patent No. 201380003537.7, 6 pages.

* cited by examiner

SERVICE DATA SCRAMBLING METHOD, SERVICE DATA DESCRAMBLING METHOD, APPARATUS AND SYSTEM

CROSS-REFERENCE TO RELATED APPLICATIONS

This application is a continuation of International Application No. PCT/CN2013/075793, filed on May 17, 2013, which is hereby incorporated by reference in its entirety.

TECHNICAL FIELD

The present invention relates to the communications field, and in particular, to a service data scrambling method, a service data descrambling method, an apparatus, and a system.

BACKGROUND

An eMBMS (enhanced Multimedia Broadcast/Multicast Service, enhanced Multimedia Broadcast/Multicast Service) is a broadcast technology used in LTE (Long Term Evolution, Long Term Evolution). In the eMBMS, a system defines a multimedia broadcast single frequency network (Multimedia Broadcast Single Frequency Network, MBSFN) area, that is, an MBSFN area. The MBSFN area includes multiple synchronized eNodeBs (evolved NodeB, evolved NodeB), and the eNodeBs in the same MBSFN no longer generate interference between themselves when sending same MBMS service data.

Based on a deployment characteristic of a wireless network, one eMBMS network generally includes multiple MBSFN areas, and each MBSFN area includes multiple eNodeBs. Each eNodeB sends MBMS (Multicast and Broadcast Management System, multicast and broadcast management system) service data to one or more UEs (User Equipment, user equipment) in the same MBSFN area. In practical application, the eNodeB generally transmits MBMS service data in the form of a carrier. At a same moment, a peripheral UE located in the MBSFN area probably receives a carrier sent by an eNodeB in another peripheral MBSFN area. That is, in a process of transmitting or receiving MBMS service data, a UE in an MBSFN area may suffer interference from MBMS service data transmitted from a peripheral MBSFN area, or may suffer interference from MBMS service data transmitted or received by one or more other UEs in a same MBSFN area. To reduce and eliminate such interference, a method for randomizing interference between different UEs and between different MBSFN areas is introduced in the LTE, where MBMS service data transmitted or received by the UE is scrambled by using a scrambling sequence, so as to reduce or eliminate interference caused by the MBMS service data transmitted or received by another UE.

A common method used currently to avoid interference between different MBSFN areas is to scramble MBMS service data by using a pseudorandom sequence, which achieves a purpose of suppressing interference between MBSFN areas. In the prior art, an area identity or a radio timeslot slot number is used as a scrambling parameter of a scrambling sequence to generate the scrambling sequence.

Because the scrambling sequence is set according to the MBSFN area identity and the radio timeslot number, that is, the MBMS service data received by the UEs in different MBMS areas at different moments have different scrambling sequences, the interference generated when the UEs in different MBMS areas transmit or receive MBMS service data can be reduced.

In a process of implementing the present invention, it is found that the prior art has at least the following problem: In a same MBMS area, if an eNodeB sends same MBMS service data to multiple UEs simultaneously, because the MBMS service data is the same and scrambling sequences are also the same, no interference is generated between the MBMS service data transmitted or received by different UEs. However, in the same MBMS area, if the eNodeB sends multiple pieces of different MBMS service data simultaneously, because the MBMS service data is different but the scrambling sequences generated for the MBMS service data are the same, relatively great interference is still generated between the MBMS service data.

SUMMARY

To resolve a problem in the prior art that relatively great interference is generated when multiple pieces of different MBMS service data are simultaneously transmitted in a same MBMS area, embodiments of the present invention provide a service data scrambling method, a service data descrambling method, an apparatus, and a system device. The technical solutions are as follows:

According to a first aspect, a service data scrambling method is provided, where the method includes:

receiving multicast broadcast service data;

using a service characteristic corresponding to the service data as a part of a scrambling parameter;

generating a scrambling sequence according to the scrambling parameter;

scrambling the service data according to the scrambling sequence; and sending the scrambled service data.

In a first possible implementation manner of the first aspect, the service characteristic includes at least one of the following characteristics:

a service identity (Service Identity) of a service corresponding to the service data;

a public land mobile network identity (PLMN Identity) to which the service belongs;

a mobile group identity (Mobile Group Identity) or a temporary mobile group identity (Temporary Mobile Group Identity) that is corresponding to the service; and a scheduling group radio network temporary identifier (Group Radio Network Temporary Identity) corresponding to the service.

With reference to the first aspect or the first possible implementation manner of the first aspect, in a second possible implementation manner, the scrambling parameter further includes:

an MBSFN area identity (MBSFN Area Identity) for scheduling the service data, and at least one of a radio frame number (Radio Frame Number), a radio subframe number (Radio Sub-Frame Number), and a radio timeslot number (Slot Number) that are used for scheduling the service data;

the generating the scrambling sequence according to the scrambling parameter includes:

generating the scrambling sequence according to the MBSFN area identity, the service characteristic, and at least one of the radio frame number, the radio subframe number, and the radio timeslot number;

or, the scrambling parameter further includes an MBSFN area identity for scheduling the service data, a codeword of the service data, and at least one of a radio frame number, a radio subframe number, and a radio timeslot number that are used for scheduling the service data; and the generating the scrambling sequence according to the scrambling parameter includes:

generating the scrambling sequence according to the MBSFN area identity, the codeword of the service data, the service characteristic, and at least one of the radio frame number, the radio subframe number, and the radio timeslot number.

With reference to the first aspect, the first possible implementation manner of the first aspect or the second possible implementation manner of the first aspect, in a third possible implementation manner, the scrambling parameter further includes:

a cell identity (Cell Identity) for scheduling the service data, and at least one of a radio frame number, a radio subframe number, and a radio timeslot number that are used for scheduling the service data;

the generating the scrambling sequence according to the scrambling parameter includes:

generating the scrambling sequence according to the cell identity, the service characteristic, and at least one of the radio frame number, the radio subframe number, and the radio timeslot number;

or the scrambling parameter further includes a cell identity for scheduling the service data, a codeword of the service data, and at least one of a radio frame number, a radio subframe number, and a radio timeslot number that are used for scheduling the service data; and the generating the scrambling sequence according to the scrambling parameter includes:

generating the scrambling sequence according to the cell identity, the codeword of the service data, the service characteristic, and at least one of the radio frame number, the radio subframe number, and the radio timeslot number.

With reference to the first aspect, the first possible implementation manner of the first aspect, the second possible implementation manner of the first aspect, or the third possible implementation manner of the first aspect, in a fourth possible implementation manner, the scrambling parameter further includes a transmission mode, and after the receiving service data, the method further includes:

determining whether the service data is unicast data or multicast data;

setting the transmission mode to either 0 or 1 if the service data is unicast data; and setting the transmission mode to the other of the 0 or 1 if the service data is multicast data.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, before the sending the scrambled service data, the method further includes:

sending the scrambling parameter or the part of the scrambling parameter to user equipment UE used to receive the service data, so that the UE acquires a descrambling parameter according to the received scrambling parameter or the received part of the scrambling parameter and generates a descrambling sequence according to the descrambling parameter; and the sending the scrambled service data includes:

sending the scrambled service data to the UE, so that the UE descrambles the scrambled service data according to the descrambling sequence after receiving the scrambled service data.

According to a second aspect, a service data descrambling method is provided, where the method includes:

acquiring a descrambling parameter, where the descrambling parameter is a scrambling parameter sent by an evolved NodeB eNodeB or a part of the scrambling parameter;

generating a descrambling sequence according to the descrambling parameter;

acquiring scrambled service data, where the scrambled service data is service data obtained by scrambling according to a scrambling sequence, where the scrambling sequence is generated according to the scrambling parameter and the eNodeB uses a service characteristic corresponding to received service data as the part of the scrambling parameter; and descrambling the acquired service data according to the descrambling sequence.

In a first possible implementation manner of the second aspect, the acquiring scrambled service data includes:

receiving the service data sent by the eNodeB.

According to a third aspect, a service data scrambling apparatus is provided, where the apparatus includes:

a receiving module, configured to receive multicast broadcast service data;

an identifying module, configured to identify a service characteristic corresponding to the service data received by the receiving module as a part of a scrambling parameter used to generate a scrambling sequence;

a scrambling sequence generating module, configured to generate the scrambling sequence according to the scrambling parameter identified by the identifying module;

a scrambling module, configured to scramble the service data according to the scrambling sequence generated by the scrambling sequence generating module; and a first sending module, configured to send the service data scrambled by the scrambling module.

In a first possible implementation manner of the third aspect, the service characteristic includes at least one of the following characteristics:

a service identity of a service corresponding to the service data;

a public land mobile network identity to which the service belongs;

a mobile group identity or a temporary mobile group identity that is corresponding to the service; and a scheduling group radio network temporary identifier corresponding to the service.

With reference to the third aspect or the first possible implementation manner of the third aspect, in a second possible implementation manner, the scrambling parameter further includes:

an MBSFN area identity for scheduling the service data, and at least one of a radio frame number, a radio subframe number, and a radio timeslot number that are used for scheduling the service data;

the scrambling sequence generating module includes:

a first generating unit, configured to generate the scrambling sequence according to the MBSFN area identity, the service characteristic corresponding to the service data received by the receiving module, and at least one of the radio frame number, the radio subframe number, and the radio timeslot number;

or, the scrambling parameter further includes an MBSFN area identity for scheduling the service data, a codeword of the service data, and at least one of a radio frame number, a radio subframe number, and a radio timeslot number that are used for scheduling the service data;

the scrambling sequence generating module further includes:

a second generating unit, configured to generate the scrambling sequence according to the MBSFN area identity, the codeword of the service data, the service characteristic, and at least one of the radio frame number, the radio subframe number, and the radio timeslot number.

With reference to the third aspect, the first possible implementation manner of the third aspect or the second possible implementation manner of the third aspect, in a third possible implementation manner, the scrambling parameter further includes:

a cell identity for scheduling the service data, and at least one of a radio frame number, a radio subframe number, and a radio timeslot number that are used for scheduling the service data;

the scrambling sequence generating module includes:

a third generating unit, configured to generate the scrambling sequence according to the cell identity, the service characteristic corresponding to the service data received by the receiving module, and at least one of the radio frame number, the radio subframe number, and the radio timeslot number;

or, the scrambling parameter further includes a cell identity for scheduling the service data, a codeword of the service data, and at least one of a radio frame number, a radio subframe number, and a radio timeslot number that are used for scheduling the service data; and the scrambling sequence generating module further includes:

a fourth generating unit, configured to generate the scrambling sequence according to the cell identity, the codeword of the service data, the service characteristic, and at least one of the radio frame number, the radio subframe number, and the radio timeslot number.

With reference to the third aspect, the first possible implementation manner of the third aspect, the second possible implementation manner of the third aspect, or the third possible implementation manner of the third aspect, in a fourth possible implementation manner, the scrambling parameter further includes a transmission mode, and the apparatus further includes:

a determining module, configured to determine whether the service data received by the receiving module is unicast data or multicast data;

a second setting module, configured to set the transmission mode to either 0 or 1 when the determining module determines that the service data is unicast data; and a third setting module, configured to set the transmission mode to the other of the 0 or 1 when the determining module determines that the service data is multicast data.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the apparatus further includes:

a second sending module, configured to send the scrambling parameter identified by the identifying module or the part of the scrambling parameter to user equipment UE used to receive the service data, so that the UE acquires a descrambling parameter according to the received scrambling parameter or the received part of the scrambling parameter and generates a descrambling sequence according to the descrambling parameter; and the first sending module is further configured to:

send the service data scrambled by the scrambling module to the UE, so that the UE descrambles the scrambled service data according to the descrambling sequence after receiving the scrambled service data.

According to a fourth aspect, a service data descrambling apparatus is provided, where the apparatus includes:

a descrambling parameter acquiring module, configured to acquire a descrambling parameter, where the descrambling parameter is a scrambling parameter sent by an evolved NodeB eNodeB or a part of the scrambling parameter;

a descrambling sequence generating module, configured to generate a descrambling sequence according to the descrambling parameter acquired by the descrambling parameter acquiring module;

a service data acquiring module, configured to acquire scrambled service data, where the scrambled service data is service data obtained by scrambling according to a scrambling sequence, where the scrambling sequence is generated according to the scrambling parameter and the evolved NodeB eNodeB uses a service characteristic corresponding to received service data as the part of the scrambling parameter; and a descrambling module, configured to descramble the received service data according to the descrambling sequence generated by the descrambling sequence generating module.

In a first possible implementation manner of the fourth aspect, the descrambling parameter acquiring module includes:

a receiving unit, configured to receive the scrambling parameter sent by the eNodeB or a part of the scrambling parameter; and an identifying unit, configured to identify the scrambling parameter received by the receiving unit or the part of the scrambling parameter as the descrambling parameter; and the service data acquiring module is configured to:

receive the scrambled service data sent by the eNodeB.

According to a fifth aspect, a service data transmission system is provided, where the system includes at least one service data scrambling apparatus provided in the third aspect and all implementation manners of the third aspect, and at least one service data descrambling apparatus provided in the fourth aspect and all implementation manners of the fourth aspect.

According to a sixth aspect, a service data transmission system is provided, where the system includes at least one eNodeB and at least one UE, the eNodeB includes at least one service data scrambling apparatus provided in the third aspect and all implementation manners of the third aspect; and the UE includes at least one service data descrambling apparatus provided in the fourth aspect and all implementation manners of the fourth aspect.

According to a seventh aspect, a service data scrambling apparatus is provided, where the apparatus includes: a receiver, a processor, and a transmitter;

the receiver is configured to receive multicast broadcast service data;

the processor is configured to identify a service characteristic corresponding to the service data as a part of a scrambling parameter used to generate a scrambling sequence;

the processor is further configured to generate the scrambling sequence according to the scrambling parameter;

the processor is further configured to scramble the service data according to the scrambling sequence; and the transmitter is configured to send the scrambled service data.

In a first possible implementation manner of the seventh aspect, the service characteristic includes at least one of the following characteristics:

a service identity of a service corresponding to the service data;

a public land mobile network identity to which the service belongs;

a mobile group identity or a temporary mobile group identity that is corresponding to the service; and a scheduling group radio network temporary identifier corresponding to the service.

With reference to the seventh aspect or the first possible implementation manner of the seventh aspect, in a second possible implementation manner, the scrambling parameter further includes:

an MBSFN area identity for scheduling the service data, and at least one of a radio frame number, a radio subframe number, and a radio timeslot number that are used for scheduling the service data;

the processor is further configured to generate the scrambling sequence according to the MBSFN area identity, the service characteristic, and at least one of the radio frame number, the radio subframe number, and the radio timeslot number;

or, the scrambling parameter further includes an MBSFN area identity for scheduling the service data, a codeword of the service data, and at least one of a radio frame number, a radio subframe number, and a radio timeslot number that are used for scheduling the service data; and the processor is further configured to generate the scrambling sequence according to the MBSFN area identity, the codeword of the service data, the service characteristic, and at least one of the radio frame number, the radio subframe number, and the radio timeslot number.

With reference to the seventh aspect, the first possible implementation manner of the seventh aspect or the second possible implementation manner of the seventh aspect, in a third possible implementation manner, the scrambling parameter further includes:

a cell identity for scheduling the service data, and at least one of a radio frame number, a radio subframe number, and a radio timeslot number that are used for scheduling the service data;

the processor is further configured to generate the scrambling sequence according to the cell identity, the service characteristic, and at least one of the radio frame number, the radio subframe number, and the radio timeslot number;

or, the scrambling parameter further includes a cell identity for scheduling the service data, a codeword of the service data, and at least one of a radio frame number, a radio subframe number, and a radio timeslot number that are used for scheduling the service data; and the processor is further configured to generate the scrambling sequence according to the cell identity, the codeword of the service data, and the service characteristic, and at least one of the radio frame number, the radio subframe number, and the radio timeslot number.

With reference to the seventh aspect, the first possible implementation manner of the seventh aspect, the second possible implementation manner of the seventh aspect, or the third possible implementation manner of the seventh aspect, in a fourth possible implementation manner, the scrambling parameter further includes a transmission mode, the processor is further configured to determine whether the service data is unicast data or multicast data;

the processor is further configured to set the transmission mode to either 0 or 1 when the service data is unicast data; and the processor is further configured to set the transmission mode to the other of the 0 or 1 when the service data is multicast data.

With reference to the seventh aspect, the first possible implementation manner of the seventh aspect, the second possible implementation manner of the seventh aspect, the third possible implementation manner of the seventh aspect, or the fourth possible implementation manner of the seventh aspect, in a fifth possible implementation manner, the transmitter is configured to send the scrambling parameter or the part of the scrambling parameter to user equipment UE used to receive the service data, so that the UE generates a descrambling parameter according to the received scrambling parameter or the received part of the scrambling parameter and generates a descrambling sequence according to the descrambling parameter; and the transmitter is further configured to send the service data to the UE, so that the UE descrambles the scrambled service data according to the descrambling sequence after receiving the scrambled service data.

According to an eighth aspect, a service data descrambling apparatus is provided, where the apparatus includes: a receiver, a processor, and a transmitter;

the receiver is configured to acquire a descrambling parameter, where the descrambling parameter is a scrambling parameter sent by an evolved NodeB eNodeB or a part of the scrambling parameter;

the processor is configured to generate a descrambling sequence according to the descrambling parameter;

the processor is further configured to acquire scrambled service data, where the scrambled service data is service data obtained by scrambling according to a scrambling sequence, where the scrambling sequence is generated according to the scrambling parameter and the eNodeB uses a service characteristic corresponding to received service data as the part of the scrambling parameter; and the processor is further configured to descramble the received service data according to the descrambling sequence.

In a first possible implementation manner of the eighth aspect, the receiver is further configured to receive the scrambling parameter sent by the eNodeB or a part of the scrambling parameter;

the processor is further configured to identify the scrambling parameter received by the receiver or the part of the scrambling parameter as the descrambling parameter; and the receiver is further configured to receive the service data sent by the eNodeB.

According to a ninth aspect, a service data transmission system is provided, where the system includes at least one service data scrambling apparatus provided in the seventh aspect and all implementation manners of the seventh aspect, and at least one service data descrambling apparatus provided in the eighth aspect and all implementation manners of the eighth aspect.

According to a tenth aspect, a service data transmission system is provided, where the system includes at least one eNodeB and at least one UE, the eNodeB includes at least one service data scrambling apparatus provided in the seventh aspect and all implementation manners of the seventh aspect; and the UE includes at least one service data descrambling apparatus provided in the eighth aspect and all implementation manners of the eighth aspect.

The technical solutions provided in the embodiments of the present invention bring the following beneficial effects:

A scrambling sequence is generated by using a service characteristic corresponding to service data, an MBSFN area identity, a radio timeslot number, and the like as scrambling parameters, the service data is scrambled according to the generated scrambling sequence, and the scrambled service data is sent; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same area, and achieving an effect that interference between different service data sent simultaneously in the same area can be reduced to a great extent.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

One eMBMS network generally includes one or more MBSFN areas, and each MBSFN area generally includes one or more cells (Cell).

Figure 1:
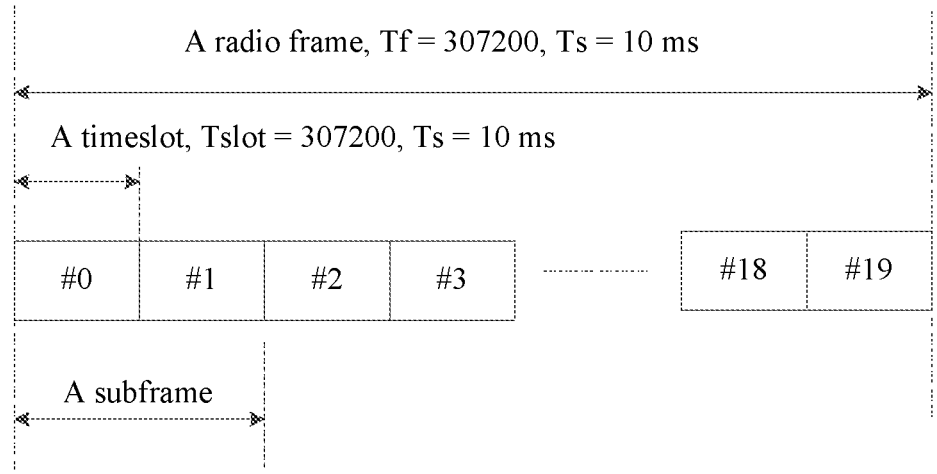
FIG. 1 is a schematic structural diagram of radio frame FDD in an LTE communications system.

Service data transmitted in an LTE communications system is transmitted according to an LTE radio frame (Radio Frame). There are commonly two types of radio frames: FDD and TDD. A frame structure of FDD is shown in FIG. 1. A length of an FDD frame is 10 ms, and is formed by 20 timeslots (Slot) whose length is 0.5 ms. Every two adjacent timeslots are one subframe (Sub-Frame). Service data sent by an eNodeB to a UE is sent on a per-subframe basis.

Figure 2:
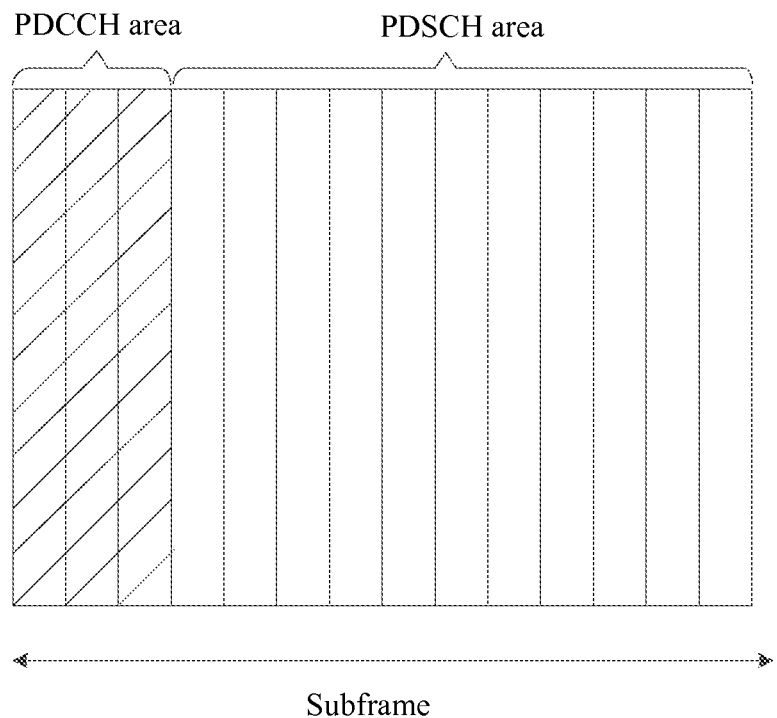
FIG. 2 is a schematic structural diagram of a subframe in an LTE communications system.

The eNodeB sends a physical downlink shared channel (Physical Downlink Shared Channel, PDSCH) and a corresponding physical downlink control channel (Physical Downlink Control Channel, PDCCH) to each cell according to a scheduling result. The PDSCH carries unicast data sent and scheduled by the eNodeB to the user equipment, and the PDCCH carries scheduling information of a PDSCH corresponding to the PDCCH, where the scheduling information is primarily used to indicate transmission format information of the PDSCH corresponding to the PDCCH, including resource allocation, a transport block size, a modulation and coding scheme, a transmission rank, precoding matrix information, and the like. The PDCCH and the PDSCH are time-division-multiplexed in a subframe. For a general cyclic prefix, each subframe includes two timeslots, and each timeslot includes seven orthogonal frequency division multiplexing (Orthogonal Frequency Division Multiplexing, OFDM) symbols, where the PDCCH is transmitted in the first n (n=1, 2, 3, 4) OFDM symbols of the first timeslot, where n is dynamically variable, and the remaining OFDM symbols are used to transmit the PDSCH. Referring to FIG. 2, FIG. 2 shows a schematic structural diagram of a subframe in an LTE communications system. The first three OFDM symbols in the first timeslot in the subframe shown in FIG. 2 are used to transmit the PDCCH, and the remaining OFDM symbols are used to transmit the PDSCH.

One subframe may send data to multiple UEs. In this case, a PDCCH area (an area existing in the subframe and used to transmit the PDCCH) may include multiple PDCCHs corresponding to the UEs, and each PDCCH points to MBMS service data in a PDSCH area (an area existing in the subframe and used to transmit the PDSCH). When receiving the PDCCH in the subframe, the UE may acquire required service data in the PDSCH area according to the PDCCH corresponding to the UE.

Embodiment 1

Figure 3:
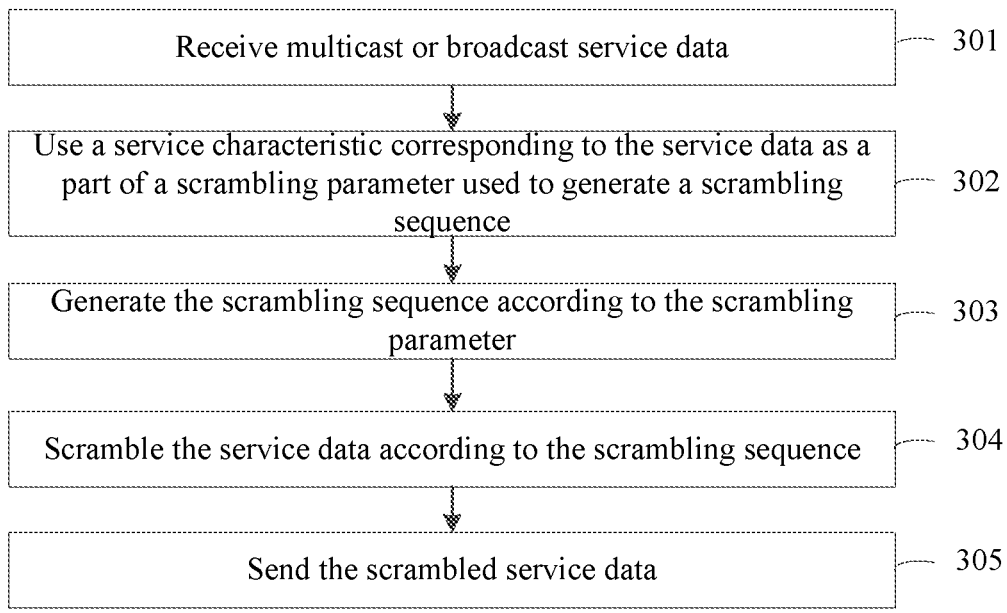
FIG. 3 is a method flowchart of a service data scrambling method according to Embodiment 1 of the present invention.

Referring to FIG. 3, FIG. 3 shows a method flowchart of a service data scrambling method according to Embodiment 1 of the present invention. The service data scrambling method may be applied to an eNodeB in an LTE communications system, and the service data scrambling method includes:

301. Receive multicast broadcast service data.

The multicast broadcast service data may be MBMS service data or other service data.

302. Use a service characteristic corresponding to the service data as a part of a scrambling parameter used to generate a scrambling sequence.

The service characteristic corresponding to the service data may generally include at least one of the following characteristics:

a service identity of a service corresponding to the service data;

a public land mobile network identity to which the service belongs;

a mobile group identity or a temporary mobile group identity that is corresponding to the service; and a scheduling group radio network temporary identifier corresponding to the service.

In practical application, the service characteristic corresponding to the service data may be used as the part of the scrambling parameter.

In an application scenario of an MBSFN area, the service data may be MBMS service data, and the scrambling parameter may further include:

an MBSFN area identity for scheduling the service data, and at least one of a radio frame number, a radio subframe number, and a radio timeslot number that are used for scheduling the service data; or an MBSFN area identity for scheduling the service data, a codeword of the service data, and at least one of a radio frame number, a radio subframe number, and a radio timeslot number that are used for scheduling the service data.

In an application scenario of a cell, the scrambling parameter may further include:

a cell identity for scheduling the service data, and at least one of a radio frame number, a radio subframe number, and a radio timeslot number that are used for scheduling the service data; or a cell identity for scheduling the service data, a codeword of the service data, and at least one of a radio frame number, a radio subframe number, and a radio timeslot number that are used for scheduling the service data.

In other words, in a multi-input multi-output (Multiple Input Multiple Output, MIMO) application scenario, that is, when a same base station simultaneously sends multiple pieces of service data, in order to distinguish the service data, the codeword of the service data may be further used as the part of the scrambling parameter.

303. Generate the scrambling sequence according to the scrambling parameter.

In an application scenario, when the scrambling parameter includes the service characteristic corresponding to the service data, an MBSFN area identity for scheduling the service data, and at least one of a radio frame number, a radio subframe number, and a radio timeslot number that are used for scheduling the service data, the generating the scrambling sequence according to the scrambling parameter may be: generating the scrambling sequence according to the MBSFN area identity, the service characteristic, and at least one of the radio frame number, the radio subframe number, and the radio timeslot number.

In another application scenario, when the scrambling parameter includes the service characteristic corresponding to the service data, an MBSFN area identity for scheduling the service data, a codeword of the service data, and at least one of a radio frame number, a radio subframe number, and a radio timeslot number that are used for scheduling the service data, the generating the scrambling sequence according to the scrambling parameter may be: generating the scrambling sequence according to the MBSFN area identity, the codeword of the service data, the service characteristic, and at least one of the radio frame number, the radio subframe number, and the radio timeslot number.

A formula for the scrambling sequence is as follows:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $c(n)$ represents a scrambling sequence to be scrambled into the $n^{th}$ bit of the service data, mod is a modulo operation, $N_C$ may be 1600, and n is any natural number from 0 to $M_{PN}-1$.

Generally, the scrambling sequence includes a first sequence and a second sequence that are defined specially. The first sequence may be defined as $C_{init}=\Sigma_{i=0}^{30}x_1(i)2^i$, that is, the first sequence is a sequence formed by $x_1(0), x_1(1), x_1(2) \ldots x_1(30)$, where $x_1(0)=1, x_1(n)=0$, and $n=1, 2, \ldots, 3$. The second sequence may be defined as $C_{init}=\Sigma_{i=0}^{30}x_2(i)2^i$.

For example, if the scrambling sequence is generated according to the service identity Service Id and a service identity PLMN Id in the service characteristic, an MBSFN area identity, and a Slot number, the second sequence may be specifically:

$$C_{init}=n_{plmn\_id}\cdot 2^{24}+n_{service\_id}\cdot 2^{13}+\lfloor n_s/2\rfloor\cdot 2^9+N_{ID}^{MBSFN}$$

where $N_{ID}^{MBSFN}$ represents the MBSFN area identity and occupies 8 bits, and $n_s$ represents the Slot number and occupies 4 bits;

$n_{service\_id}$ represents the service identity of the service data, and may also be a part of the service identity because the service identity may be relatively long, and occupies 11 bits; $n_{plmn\_id}$ represents a PLMN Id (6 bits) that provides a service, and includes a mobile country code MCC (3 bits) and a mobile network code MNC (3 bits). That is, the first eight bits $x_2(0), x_2(1), x_2(2) \ldots x_2(7)$ of the second sequence correspond to the MBSFN area identity of the service data respectively, the $9^{th}$ to $12^{th}$ bits $x_2(8), x_2(9) \ldots x_2(11)$ of the second sequence correspond to the radio timeslot (Slot) number of the service data respectively, the $13^{th}$ to $23^{rd}$ bits $x_2(12), x_2(13) \ldots x_2(22)$ of the second sequence correspond to the service identity respectively, and the $24^{th}$ to $29^{th}$ bits $x_2(23), x_2(24) \ldots x_2(28)$ of the second sequence correspond to the PLMN Id of the service respectively.

$x_1(n+31)$ $x_2(n+31)$ and may be obtained according to the first sequence, the defined second sequence, and the foregoing formula, where n is any natural number from 0 to $M_{PN}-1$, and $M_{PN}$ is a quantity of bits of one codeword transmitted in a physical downlink shared channel PDSCH in one subframe.

For example, if the scrambling sequence is generated according to a scheduling group radio network temporary identifier Group Id corresponding to the service in the service characteristic, the MBSFN area identity, and the Slot number, the second sequence may be specifically:

$$c_{init}=n_{group\_id}\cdot 2^{13}+\lfloor n_s/2\rfloor\cdot 2^9+N_{ID}^{MBSFN}$$

If the scrambling sequence is generated according to the Group Id and the Service Id in the service characteristic, the MBSFN area identity, and the Slot number, the second sequence may be specifically:

$$c_{init}=n_{group\_id} \cdot 2^{16}+n_{service\_id} \cdot 2^{13}+\lfloor n_s/2 \rfloor \cdot 2^9+N_{ID}^{MBSFN}$$

If the scrambling sequence is generated according to the Group Id and the PLMN Id in the service characteristic, the MBSFN area identity, and the Slot number, the second sequence may be specifically:

$$c_{init}=n_{plmn\_id} \cdot 2^{24}+n_{group\_id} \cdot 2^{13}+\lfloor n_s/2 \rfloor \cdot 2^9+N_{ID}^{MBSFN}$$

If the scrambling sequence is generated according to the Group Id, the Service Id and the PLMN Id in the service characteristic, the MBSFN area identity, and the Slot number, the second sequence may be specifically:

$$c_{init}=n_{plmn\_id} \cdot 2^{24}-n_{group\_id} \cdot 2^{20}+n_{service\_id} \cdot 2^{13}+\lfloor n_s/2 \rfloor \cdot 2^9+N_{ID}^{MBSFN}$$

In a MIMO application scenario, a codeword in the service characteristic may be added to a predetermined bit in the second sequence to generate the scrambling sequence, for example:

$$c_{init}=n_{plmn\_id} \cdot 2^{24}+n_{service\_id} \cdot 2^{14}+q \cdot 2^{13}+\lfloor n_s/2 \rfloor \cdot 2^9+N_{ID}^{MBSFN}$$

where q represents a codeword of the service data, which is placed on the 13$^{th}$ bit in the second sequence in this scenario. When two pieces of service data exist, q may be 0 or 1. For example, when q is 0, it indicates that the scrambling sequence is generated for the first piece of service data; when q is 1, it indicates that the scrambling sequence is generated for the second piece of service data.

In an application scenario, when the scrambling parameter includes the service characteristic corresponding to the service data, a cell identity for scheduling the service data, and at least one of a radio frame number, a radio subframe number, and a radio timeslot number that are used for scheduling the service data, the generating the scrambling sequence according to the scrambling parameter may be: generating the scrambling sequence according to the cell identity, the service characteristic, and at least one of the radio frame number, the radio subframe number, and the radio timeslot number.

In another application scenario, when the scrambling parameter includes the service characteristic corresponding to the service data, a cell identity for scheduling the service data, a codeword of the service data, and at least one of a radio frame number, a radio subframe number, and a radio timeslot number that are used for scheduling the service data, the generating the scrambling sequence according to the scrambling parameter may be: generating the scrambling sequence according to the cell identity, the codeword of the service data, the service characteristic, and at least one of the radio frame number, the radio subframe number, and the radio timeslot number.

For example, if the scrambling sequence is generated according to the Group Id and the Service Id in the service characteristic, the cell identity Cell Id, and the Slot number, the second sequence may be specifically:

$$c_{init}=n_{plmn\_id} \cdot 2^{24}+n_{service\_id} \cdot 2^{13}+\lfloor n_s/2 \rfloor \cdot 2^9+N_{ID}^{cell}$$

where $N_{ID}^{cell}$ represents the cell identity and occupies 8 bits; $n_s$ represents the Slot number, and occupies 4 bits of the sequence; $n_{service\_id}$ represents the service identity and may be a part of the service identity because the service identity may be relatively long, and occupies 11 bits; $n_{plmn\_id}$ represents a PLMN Id (6 bits) that provides a service, and includes an MCC (3 bits) and an MNC (3 bits).

In a specific application scenario, the scrambling parameter may further include a transmission mode of the service data. Therefore, the transmission mode of the service data may be added to the maximum bit or another predetermined bit in the second sequence to generate the scrambling sequence.

When the scrambling sequence is generated according to the transmission mode of the service data, after step 301, the service data scrambling method generally may further include the following steps:

First, determine whether the service data is unicast data or multicast data.

Second, set the transmission mode to either 0 or 1 if the service data is unicast data.

Third, set the transmission mode to the other of the 0 or 1 if the service data is multicast data.

In this way, the eNodeB first determines whether the service data is unicast data or multicast data, and then sets a corresponding value of the transmission mode, so that the second sequence is generated according to the value. For example, $$c_{init}=r \cdot 2^{30}+n_{plmn\_id} \cdot 2^{24}+n_{service\_id} \cdot 2^{13}+\lfloor n_s/2 \rfloor \cdot 2^9+N_{ID}^{MBSFN}$$

upon generating a scrambling sequence for transmitting unicast data, r=0, and, upon generating a scrambling sequence for transmitting multicast data, r=1; or, upon generating a scrambling sequence for transmitting unicast data, r=1, and, upon generating a scrambling sequence for transmitting multicast data, r=0.

304. Scramble the service data according to the scrambling sequence.

The service data is formed by a series of codewords b, and is specifically denoted by $b^{(q)}(0), \ldots, b^{(q)}(M_{bit}^{(q)}-1)$, where $M_{bit}^{(q)}$ represents a quantity of bits transmitted in a subframe, where the bits belong to service data whose data identifier is q. A scrambled bit sequence is $\tilde{b}^{(q)}(0), \ldots, \tilde{b}^{(q)}(M_{bit}^{(1)}-1)$, and a scrambling manner is as follows:

$$\tilde{b}^{(q)}(i)=(b^{(q)}(i)+c^{(q)}(i)) \bmod 2$$

where the scrambling sequence $c^{(q)}(i)$ is generated according to the following method. If a length of an output sequence c(n) is $M_{PN}$, the value of n is n=0, 1, ..., $M_{PN}-1$.

305. Send the scrambled service data.

In a specific application scenario, before sending the scrambled service data to the UE, the eNodeB sends the scrambling parameter to the user equipment UE used to receive the service data, and then the eNodeB sends the scrambled service data to the UE, so that the UE generates a descrambling sequence according to the scrambling parameter after receiving the scrambling parameter. After receiving the scrambled service data, the UE descrambles the scrambled service data according to the descrambling sequence.

Generally, the scrambling parameter is set in a PDCCH of a subframe sent by the eNodeB to the UE, and the scrambled service data is set in a PDSCH of the subframe sent by the eNodeB to the UE.

In conclusion, according to the service data scrambling method provided in this embodiment of the present invention, a scrambling sequence is generated by using a service characteristic corresponding to service data, an MBSFN area identity, a radio timeslot number, and the like as scrambling parameters, and the service data is scrambled according to the generated scrambling sequence; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same service area, and achieving an effect that interference between different service data sent simultaneously in the same service area can be reduced to a great extent.

Embodiment 2

Figure 4:
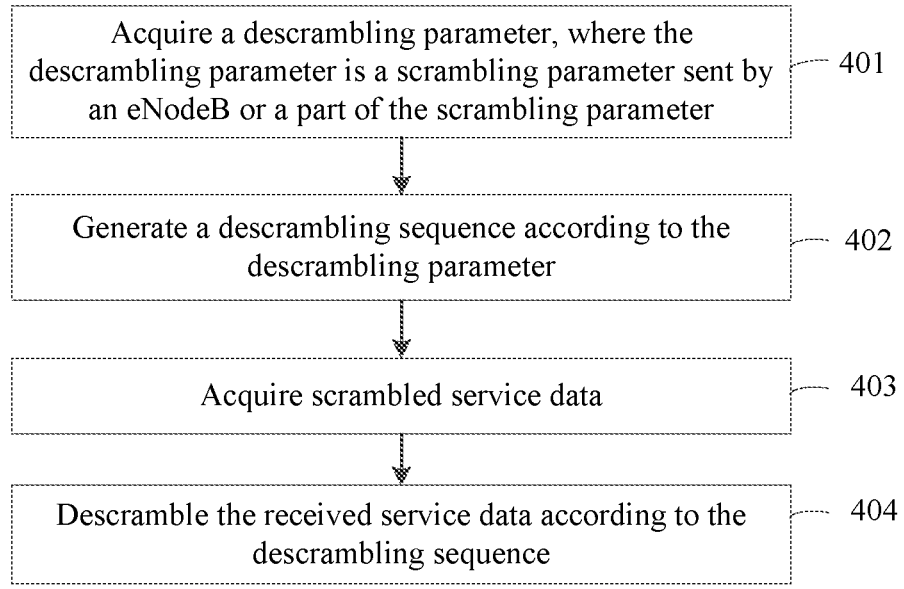
FIG. 4 is a method flowchart of a service data descrambling method according to Embodiment 2 of the present invention.

Referring to FIG. 4, FIG. 4 shows a method flowchart of a service data descrambling method according to Embodiment 2 of the present invention. The service data descrambling method may be applied to a UE in an LTE communications system, and the service data descrambling method includes:

401. Acquire a descrambling parameter, where the descrambling parameter is a scrambling parameter sent by an eNodeB or a part of the scrambling parameter.

The acquiring a descrambling parameter may include:

first, receiving the scrambling parameter sent by the eNodeB or the part of the scrambling parameter; and second, using the scrambling parameter or the part of the scrambling parameter as the descrambling parameter.

That is, for the UE, after the UE receives the scrambling parameter sent by the eNodeB or the part of the scrambling parameter, the UE may use the scrambling parameter as a descrambling parameter used to descramble the service data, or may use the part of the scrambling parameter as the descrambling parameter used to descramble the service data.

For example, a service characteristic corresponding to the service data in the scrambling parameter may be used as the descrambling parameter; for example, one or more of the following may be used as the descrambling parameter: a service identity of a service corresponding to the service data in the scrambling parameter, a public land mobile network identity to which the service belongs, a mobile group identity or a temporary mobile group identity that is corresponding to the service, and a scheduling group radio network temporary identifier corresponding to the service.

402. Generate a descrambling sequence according to the descrambling parameter.

For example, when the identified descrambling parameter includes the service characteristic corresponding to the service data, the generating a descrambling sequence according to the descrambling parameter may be: generating the descrambling sequence according to the service characteristic corresponding to the service data.

403. Acquire scrambled service data, where the scrambled service data is service data obtained by scrambling according to a scrambling sequence, where the scrambling sequence is generated according to the scrambling parameter and the eNodeB uses a service characteristic corresponding to received service data as the part of the scrambling parameter.

Generally, the scrambled service data acquired by the UE is the scrambled service data sent by the eNodeB to the UE.

403. Descramble the received service data according to the descrambling sequence.

In practical application, the UE first receives the PDCCH sent by the eNodeB, and then parses the PDCCH to obtain the descrambling parameter, and then generates the corresponding descrambling sequence according to the descrambling parameter. When receiving the PDSCH sent by the eNodeB and corresponding to the PDCCH, the UE descrambles the service data in the PDSCH according to the descrambling sequence.

In conclusion, according to the service data descrambling method provided in this embodiment of the present invention, a scrambling parameter used for scrambling service data is received, and a descrambling sequence is generated according to the scrambling parameter; after the service data is received, the service data is descrambled according to the descrambling sequence, and then a process of descrambling the scrambled service data is complete.

Embodiment 3

Figure 5:
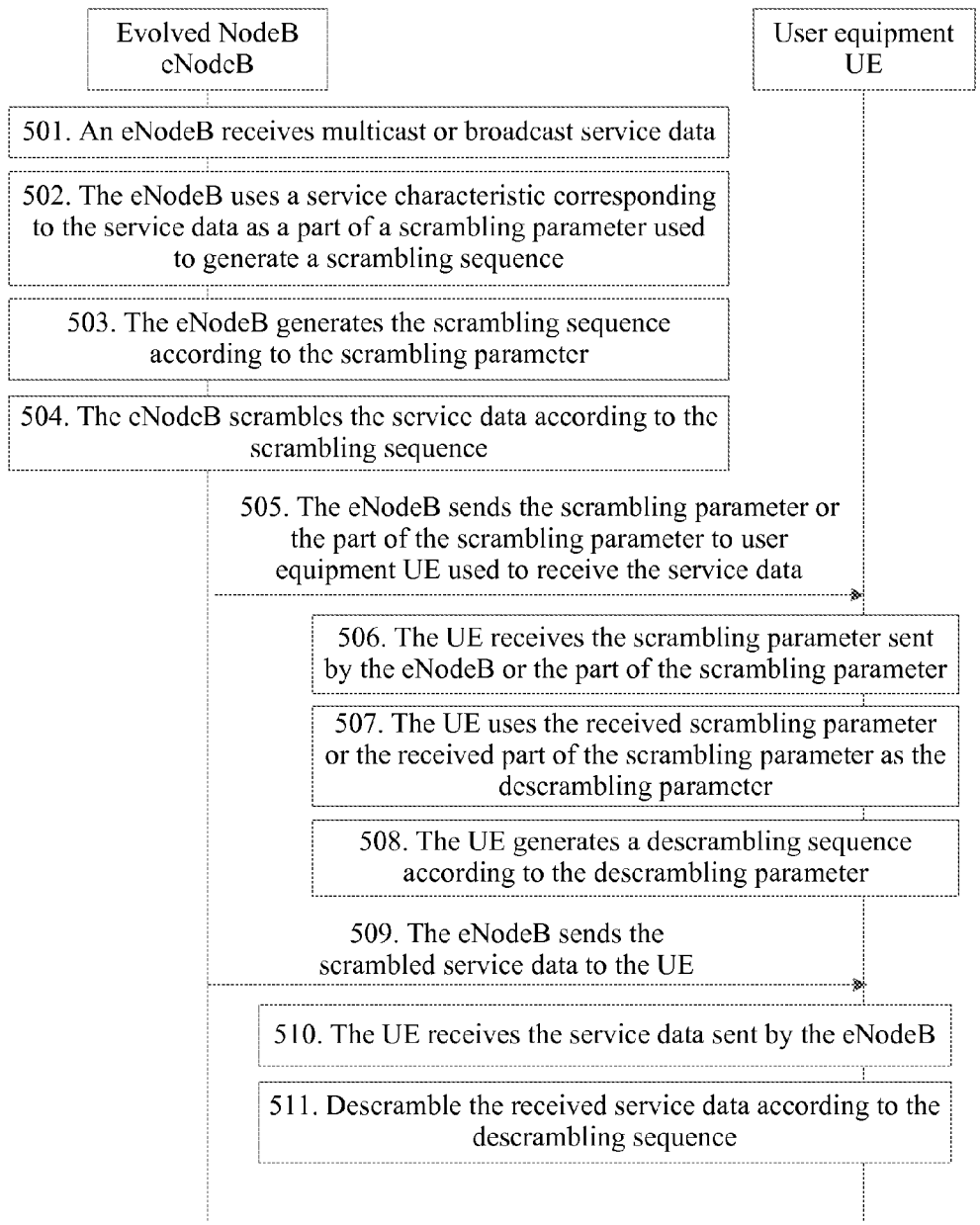
FIG. 5 is a method flowchart of a service data transmission method according to Embodiment 3 of the present invention.

Referring to FIG. 5, FIG. 5 shows a method flowchart of a service data transmission method according to Embodiment 3 of the present invention. The service data transmission method is applied to an LTE communications system, and the service data transmission method includes:

501. An eNodeB receives multicast broadcast service data.

502. The eNodeB uses a service characteristic corresponding to the service data as a part of a scrambling parameter used to generate a scrambling sequence.

503. The eNodeB generates the scrambling sequence according to the scrambling parameter.

504. The eNodeB scrambles the service data according to the scrambling sequence.

505. The eNodeB sends the scrambling parameter or the part of the scrambling parameter to user equipment UE used to receive the service data.

506. The UE receives the scrambling parameter sent by the eNodeB or the part of the scrambling parameter.

507. The UE uses the received scrambling parameter or the received part of the scrambling parameter as the descrambling parameter.

508. The UE generates a descrambling sequence according to the descrambling parameter.

509. The eNodeB sends the scrambled service data to the UE.

510. The UE receives the service data sent by the eNodeB.

511. Descramble the received service data according to the descrambling sequence.

Figure 6A:
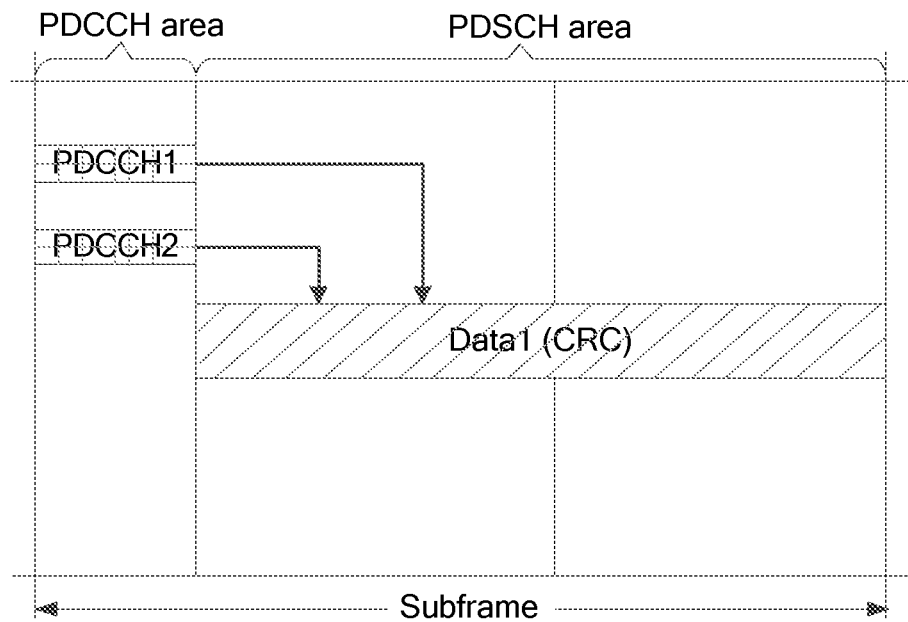
FIG. 6A is a schematic structural diagram of a subframe in the case of independent scheduling according to some embodiments of the present invention.

In an application scenario of independent scheduling, referring to FIG. 6A, FIG. 6A shows a schematic structural diagram of a subframe in the case of independent scheduling according to some embodiments of the present invention. A process of service data transmission may include the following processes:

Step 1: The eNodeB allocates an identity C-RNTI 1 to a UE 1, and allocates an identity C-RNTI 2 to a UE 2.

Step 2: The eNodeB sends a scrambling parameter separately to the UE 1 and the UE 2, for example, a group identity Group RNTI, or a service Service identity, or a session Session identity.

Step 3: The eNodeB sends downlink scheduling signaling PDCCH 1 to the UE 1.

The PDCCH 1 may be scrambled by using the C-RNTI allocated to the UE 1, and the PDCCH 1 includes PDSCH resource information used to instruct the UE 1 to receive data TransportBlock 1, where the TransportBlock 1 may include data Data 1 correspondingly.

The PDCCH 1 carries group scheduling indication information, where the group scheduling indication information may be used to notify the UE 1 that the scheduling is group scheduling.

Step 4: The eNodeB uses the scrambling parameter Group RNTI, or the Service identity, or the Session identity to generate a scrambling sequence, and according to the scrambling sequence, scrambles the data transmitted over the PDSCH.

Step 5: The eNodeB sends downlink scheduling signaling PDCCH 2 to the UE 2.

The PDCCH 2 may be scrambled by using the C-RNTI 2 allocated to the UE 2, and the PDCCH 2 includes PDSCH resource information used to indicate the TransportBlock 1.

The PDCCH 2 carries group scheduling indication information, where the group scheduling indication information may be used to notify the UE 2 that the scheduling is group scheduling.

Step 6: The UE 1 detects the PDCCH 1 that is sent by the eNodeB to the UE 1, and then decodes the PDCCH 1, and receives the TransportBlock 1 over the PDSCH according to the resource information indicated by the PDCCH 1.

Specifically, according to the group scheduling indication carried in the PDCCH 1, the UE 1 learns that current scheduling is group scheduling, and then may descramble the received data by using the descrambling parameter (such as Group RNTI, or Service identity, or Session identity) of the group scheduling.

Generally, a CRC (Cyclic Redundancy Check, cyclic redundancy check) check may be performed on the TransportBlock 1. If the CRC check performed by the UE 1 on the TransportBlock 1 is passed, the UE 1 receives the TransportBlock 1 successfully; otherwise, the UE 1 fails to receive the TransportBlock 1.

Step 7: The UE 2 detects the PDCCH 2 that is sent by the eNodeB to the UE 2, and then decodes the PDCCH 2, and receives the TransportBlock 1 over the PDSCH according to the resource information indicated by the PDCCH 2.

Specifically, according to the group scheduling indication carried in the PDCCH 2, the UE 2 learns that current scheduling is group scheduling, and then may descramble the received data by using the descrambling parameter (such as Group RNTI, or Service identity, or Session identity) of the group scheduling.

Generally, a CRC check may be performed on the TransportBlock 1. If the CRC check performed by the UE 2 on the TransportBlock 1 is passed, the UE 2 receives the TransportBlock 1 successfully; otherwise, the UE 2 fails to receive the TransportBlock 1.

Figure 6B:
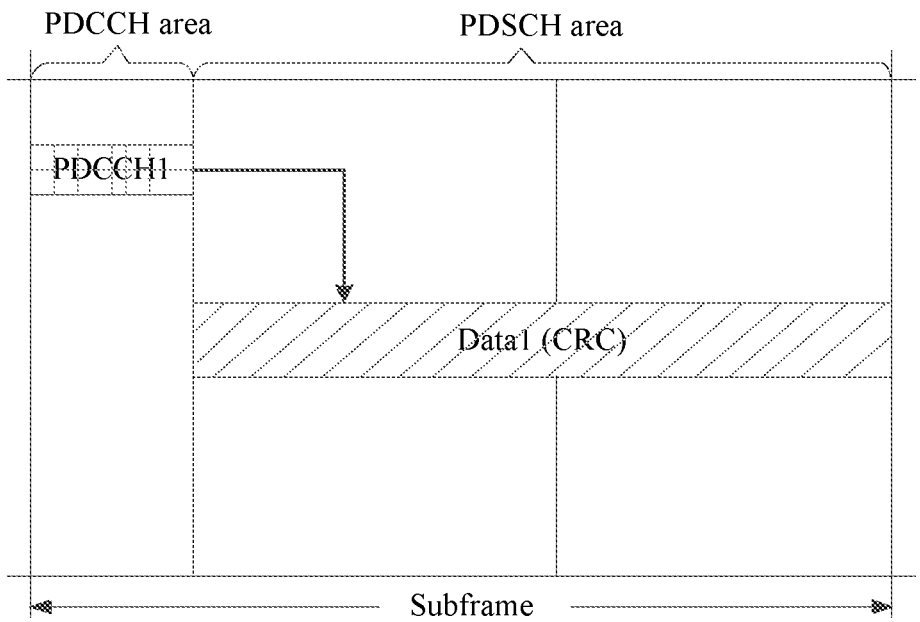
FIG. 6B is a schematic structural diagram of a subframe in the case of group scheduling according to some embodiments of the present invention.

In an application scenario of group scheduling, referring to FIG. 6B, FIG. 6B shows a schematic structural diagram of a subframe in the case of group scheduling according to some embodiments of the present invention. A process of service data transmission may include the following processes:

Step 1: The eNodeB allocates an identity Group C-RNTI 1 to a UE 1 in a Group 1, and allocates an identity Group C-RNTI 1 to a UE 2 in the Group 1.

Step 2: The eNodeB separately sends a scrambling parameter to the UE 1 and the UE 2, for example, a Group RNTI, or a Service identity, or a Session identity.

Step 3: The eNodeB sends downlink scheduling signaling PDCCH 1 to a UE included in the Group 1 identified by the Group C-RNTI 1, where the PDCCH 1 may be scrambled by using the Group C-RNTI 1 allocated to the Group 1, and the PDCCH 1 includes PDSCH resource information used to instruct the UE in the Group 1 to receive TransportBlock 1.

Step 4: The eNodeB uses the Group RNTI, or the Service identity, or the Session identity to generate a scrambling sequence, and scrambles data transmitted over the PDSCH.

For example, the eNodeB uses the Group RNTI and a cell identity to generate a scrambling code sequence. A formula for a corresponding second sequence is as follows:

$$c_{init} = n_{Group\_RNTI} \cdot 2^{14} + q \cdot 2^{13} + \lfloor n_s/2 \rfloor \cdot 2^9 + N_{ID}^{cell}$$

Step 5: The UE 1 detects the PDCCH 1 that is sent to the Group 1 to which the UE 1 belongs, and the UE 1 decodes the PDCCH 1 and receives the TransportBlock 1 over the PDSCH according to the resource information indicated by the PDCCH 1.

Specifically, a CRC check may be performed on the TransportBlock 1. If the CRC check performed by the UE 1 on the TransportBlock 1 is passed, the UE 1 receives the TransportBlock 1 successfully; otherwise, the UE 1 fails to receive the TransportBlock 1.

Step 6: The UE 1 uses the Group RNTI, or the Service identity, or the Session identity to generate a descrambling code sequence, and descrambles data Data 1 transmitted over the PDSCH.

It should be noted that the eNodeB may further configure the UE 1, so that the UE 1 detects, in a particular time segment, a PDCCH scheduling message sent by the eNodeB to the Group 1. For example, the eNodeB configures a frame number, a period, and the like for the UE 1 to detect the PDCCH scheduling message of the Group 1. On a subframe of a specified frame number and a specified period broadcast by the eNodeB or indicated by control signaling, the UE 1 detects the PDCCH scheduling message sent by the eNodeB to the Group 1.

Step 7: The UE 2 detects the PDCCH 1 that is sent to the Group 1 to which the UE 2 belongs, and the UE 1 descrambles the PDCCH 1 and receives the TransportBlock 1 over the PDSCH according to the resource information indicated by the PDCCH 1.

Specifically, a CRC check may be performed on the TransportBlock 1. If the CRC check performed by the UE 1 on the TransportBlock 1 is passed, the UE 1 receives the TransportBlock 1 successfully; otherwise, the UE 1 fails to receive the TransportBlock 1.

Step 8: The UE 1 uses the Group RNTI, or the Service identity, or the Session identity to generate a scrambling code sequence, and descrambles the data transmitted over the PDSCH.

Figure 6C:
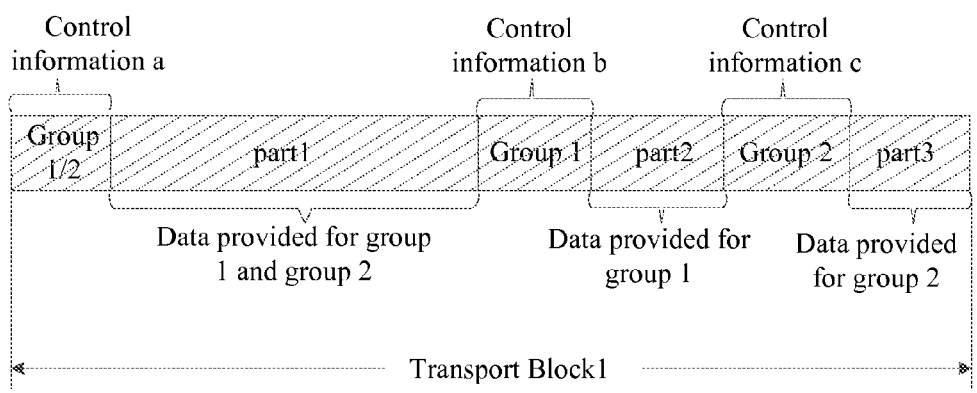
FIG. 6C is a schematic structural diagram of a data block in a PDSCH in the case of group scheduling according to some embodiments of the present invention.

Optionally, the TransportBlock 1 may include an indication of allocating same data content to a same group and/or different groups. The Transport Block may include data receiving control indication information such as a group identity of received data and a length of received data. As shown in FIG. 6C, both a group 1 and a group 2 indicated by control information a need to receive data of Part 1; the group 1 indicated by control information b needs to receive data of Part 2; the group 2 indicated by control information c needs to receive data of Part 3; the UE that receives the Transport Block receives data in the Transport Block according to the control indication information. Before sending the data, the eNodeB needs to configure the control information, which is different between groups, for the UE. When receiving the data of this format, the UE receives, according to the configured control information, data of a group to which the UE belongs.

In conclusion, according to the service data transmission method provided in this embodiment of the present invention, a scrambling sequence is generated by using a service characteristic corresponding to service data, an MBSFN area identity, a radio timeslot number, and the like as scrambling parameters, and the service data is scrambled according to the generated scrambling sequence; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same service area, and achieving an effect that interference between different service data sent simultaneously in the same service area can be reduced to a great extent.

Embodiment 4

Figure 7:
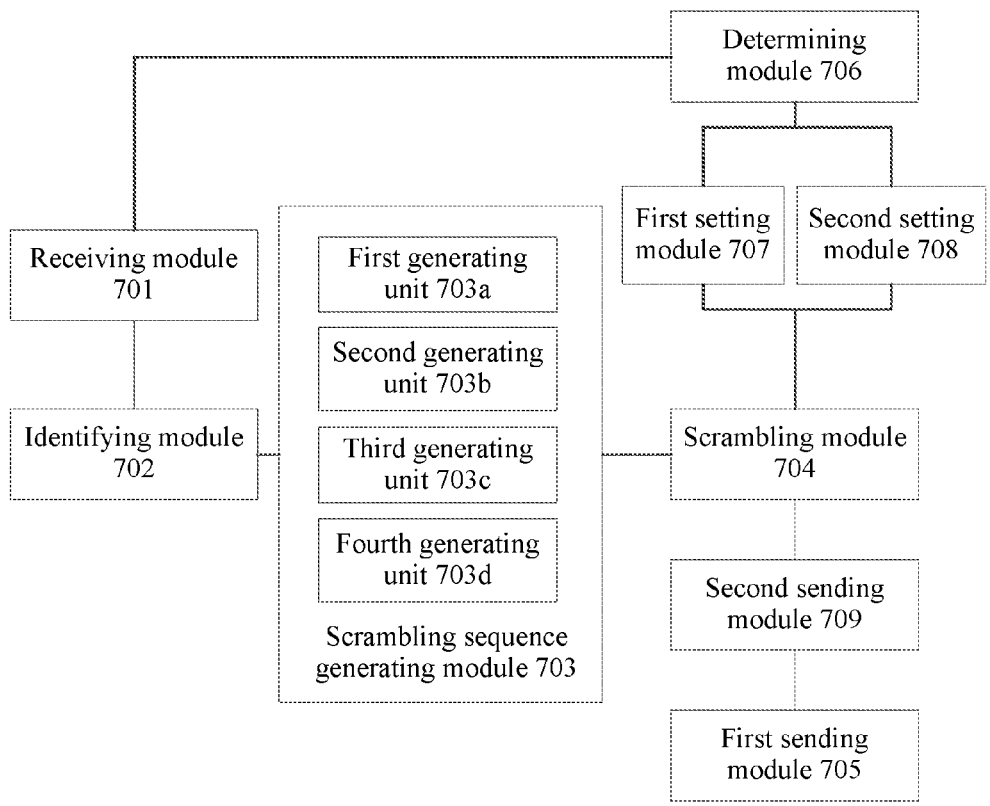
FIG. 7 is a schematic structural diagram of a service data scrambling apparatus according to Embodiment 4 of the present invention.

Referring to FIG. 7, FIG. 7 shows a schematic structural diagram of a service data scrambling apparatus according to Embodiment 4 of the present invention. The service data scrambling apparatus may be implemented as an eNodeB or implemented as a part of the eNodeB. The service data scrambling apparatus may include but is not limited to: a receiving module 701, an identifying module 702, a scrambling sequence generating module 703, and a scrambling module 704.

The receiving module 701 may be configured to acquire multicast broadcast service data.

The identifying module 702 may be configured to identify a service characteristic corresponding to the service data received by the receiving module 701 as a part of a scrambling parameter used to generate a scrambling sequence.

Preferably, the service characteristic includes at least one of the following characteristics:

a service identity of a service corresponding to the service data;

a public land mobile network identity to which the service belongs;

a mobile group identity or a temporary mobile group identity that is corresponding to the service; and a scheduling group radio network temporary identifier corresponding to the service.

The scrambling sequence generating module 703 may be configured to generate the scrambling sequence according to the scrambling parameter identified by the identifying module 702.

For example, the scrambling parameter further includes:

an MBSFN area identity for scheduling the service data, and at least one of a radio frame number, a radio subframe number, and a radio timeslot number that are used for scheduling the service data.

The scrambling sequence generating module 703 includes:

a first generating unit 703a, configured to generate the scrambling sequence according to the MBSFN area identity, the service characteristic corresponding to the service data acquired by the receiving module 701, and at least one of the radio frame number, the radio subframe number, and the radio timeslot number.

For another example, the scrambling parameter further includes an MBSFN area identity for scheduling the service data, a codeword of the service data, and at least one of a radio frame number, a radio subframe number, and a radio timeslot number that are used for scheduling the service data.

The scrambling sequence generating module 703 further includes:

a second generating unit 703b, configured to generate the scrambling sequence according to the MBSFN area identity, the codeword of the service data, the service characteristic corresponding to the service data acquired by the receiving module 701, and at least one of the radio frame number, the radio subframe number, and the radio timeslot number.

For another example, the scrambling parameter further includes:

a cell identity for scheduling the service data, and at least one of a radio frame number, a radio subframe number, and a radio timeslot number that are used for scheduling the service data.

The scrambling sequence generating module 703 includes:

a third generating unit 703c, configured to generate the scrambling sequence according to the cell identity, the service characteristic corresponding to the service data received by the receiving module 701, and at least one of the radio frame number, the radio subframe number, and the radio timeslot number.

For another example, the scrambling parameter further includes a cell identity for scheduling the service data, a codeword of the service data, and at least one of a radio frame number, a radio subframe number, and a radio timeslot number that are used for scheduling the service data, and the scrambling sequence generating module 703 further includes:

a fourth generating unit 703d, configured to generate the scrambling sequence according to the cell identity, the codeword of the service data, the service characteristic corresponding to the service data acquired by the receiving module 701, and at least one of the radio frame number, the radio subframe number, and the radio timeslot number.

The scrambling module 704 may be configured to scramble the service data according to the scrambling sequence generated by the scrambling sequence generating module 703.

A first sending module 705 may be configured to send the service data scrambled by the scrambling module 704.

Preferably, the service data scrambling apparatus may further include: a determining module 706, a second setting module 707, and a third setting module 708.

The determining module 706 may be configured to determine whether the service data received by the receiving module 701 is unicast data or multicast data.

The second setting module 707 may be configured to set the transmission mode to either 0 or 1 when the determining module 706 determines that the service data is unicast data.

The third setting module 708 may be configured to set the transmission mode to the other of the 0 or 1 when the determining module 706 determines that the service data is multicast data.

Preferably, the service data scrambling apparatus may further include: a second sending module 709.

The second sending module 709 may be configured to send the scrambling parameter identified by the identifying module 702 or a part of the scrambling parameter to user equipment UE used to receive the service data, so that the UE generates a descrambling sequence according to the scrambling parameter or the part of the scrambling parameter after receiving the scrambling parameter or the part of the scrambling parameter.

The first sending module 705 may further be configured to send the service data scrambled by the scrambling module to the UE, so that the UE descrambles the scrambled service data according to the descrambling sequence after receiving the scrambled service data.

In conclusion, according to the service data scrambling apparatus provided in this embodiment of the present invention, a scrambling sequence is generated by using a service characteristic corresponding to service data, an MBSFN area identity, a radio timeslot number, and the like as scrambling parameters, and the service data is scrambled according to the generated scrambling sequence; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same service area, and achieving an effect that interference between different service data sent simultaneously in the same service area can be reduced to a great extent.

Embodiment 5

Figure 8:
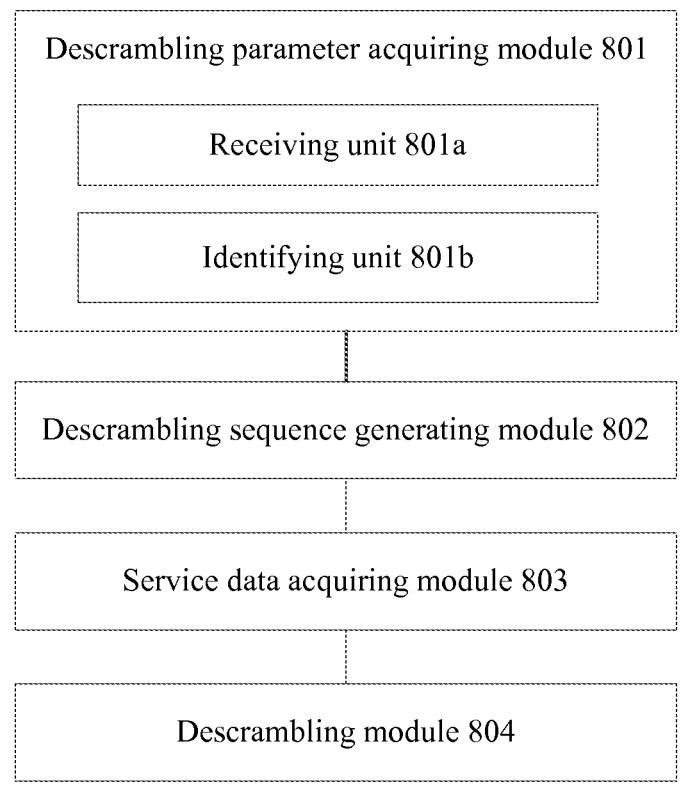
FIG. 8 is a schematic structural diagram of a service data descrambling apparatus according to Embodiment 5 of the present invention.

Referring to FIG. 8, FIG. 8 shows a schematic structural diagram of a service data descrambling apparatus according to Embodiment 5 of the present invention. The service data descrambling apparatus may be implemented as a UE or implemented as a part of the UE. The service data descrambling apparatus may include but is not limited to: an acquiring module 801, a descrambling sequence generating module 802, a service data acquiring module 803 and a descrambling module 804.

The descrambling parameter acquiring module 801 may be configured to acquire a descrambling parameter, where the descrambling parameter is a scrambling parameter sent by an evolved NodeB eNodeB or a part of the scrambling parameter.

Preferably, the descrambling parameter acquiring module 801 may further include a receiving unit 810a and an identifying unit 810b.

The receiving unit 810a is configured to receive the scrambling parameter sent by the eNodeB or the part of the scrambling parameter.

The identifying unit 810b is configured to identify the scrambling parameter received by the receiving unit or the part of the scrambling parameter as the descrambling parameter.

The descrambling sequence generating module 802 may be configured to generate a descrambling sequence according to the scrambling parameter acquired by the acquiring module 801.

The service data acquiring module 803 is configured to acquire scrambled service data, where the scrambled service data is service data obtained by scrambling according to a scrambling sequence, where the scrambling sequence is generated according to the scrambling parameter and the eNodeB uses a service characteristic corresponding to received service data as a part of the scrambling parameter for generating the scrambling sequence.

Preferably, the service data acquiring module 803 may be configured to receive the service data sent by the eNodeB.

The descrambling module 804 may be configured to: according to the descrambling sequence generated by the descrambling sequence generating module 802, descramble the service data acquired by the service data acquiring module 803.

In conclusion, according to the service data descrambling apparatus provided in this embodiment of the present invention, a scrambling parameter used for scrambling service data is received, and a descrambling sequence is generated according to the scrambling parameter; after the service data is received, the service data is descrambled according to the descrambling sequence, and then a process of descrambling the scrambled service data is complete.

It should be noted that, according to the service data scrambling apparatus and the service data descrambling apparatus provided in the foregoing embodiments, when service data is transmitted, division of the foregoing functional modules is merely used as an example for description. In practical application, the foregoing functions may be implemented by different functional modules according to a requirement. That is, an internal structure of the eNodeB or UE may be divided into different functional modules, so as to perform all or some of the functions described above. In addition, the service data scrambling apparatus and service data scrambling method embodiments provided in the foregoing embodiments belong to a same concept, and the service data descrambling apparatus and service data descrambling method embodiments provided in the foregoing embodiments belong to a same concept. For a detailed implementation process, refer to the method embodiments, and details are not described herein again.

Embodiment 6

Figure 9:
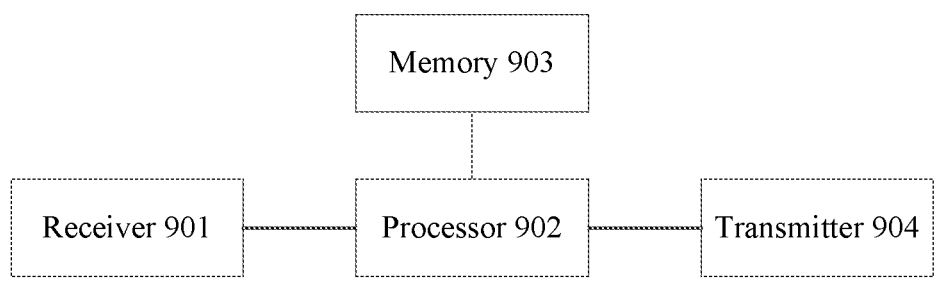
FIG. 9 is a schematic structural diagram of a service data scrambling apparatus according to Embodiment 6 of the present invention.

Referring to FIG. 9, FIG. 9 shows a schematic structural diagram of a service data scrambling apparatus according to Embodiment 6 of the present invention. The service data scrambling apparatus may be implemented as an eNodeB or implemented as a part of the eNodeB. The service data scrambling apparatus may include: a receiver 901, a processor 902, a memory 903, and a transmitter 904, where the memory 903 stores one or more pieces of computer software, and the processor 902 may perform corresponding operations according to the computer software.

The receiver 901 is configured to receive multicast broadcast service data.

The processor 902 is configured to identify a service characteristic corresponding to the service data as a part of a scrambling parameter used to generate a scrambling sequence.

The processor 902 is further configured to generate a scrambling sequence according to the scrambling parameter.

The processor 902 is further configured to scramble the service data according to the scrambling sequence.

The transmitter 904 is further configured to send the scrambled service data.

Preferably, the service characteristic includes at least one of the following characteristics:

a service identity of a service corresponding to the service data;

a public land mobile network identity to which the service belongs;

a mobile group identity or a temporary mobile group identity that is corresponding to the service; and a scheduling group radio network temporary identifier corresponding to the service.

The scrambling parameter further includes:

an MBSFN area identity for scheduling the service data, and at least one of a radio frame number, a radio subframe number, and a radio timeslot number that are used for scheduling the service data.

The processor 902 is further configured to generate the scrambling sequence according to the MBSFN area identity, the service characteristic, and at least one of the radio frame number, the radio subframe number, and the radio timeslot number.

Preferably, the scrambling parameter may further include:

an MBSFN area identity for scheduling the service data, a codeword of the service data, and at least one of a radio frame number, a radio subframe number, and a radio timeslot number that are used for scheduling the service data.

The processor 902 is further configured to generate the scrambling sequence according to the MBSFN area identity, the codeword of the service data, the service characteristic, and at least one of the radio frame number, the radio subframe number, and the radio timeslot number.

Preferably, the scrambling parameter further includes:

a cell identity for scheduling the service data, and at least one of a radio frame number, a radio subframe number, and a radio timeslot number that are used for scheduling the service data.

The processor 902 is further configured to generate the scrambling sequence according to the cell identity, the service characteristic, and at least one of the radio frame number, the radio subframe number, and the radio timeslot number.

Preferably, the scrambling parameter may further include:

a cell identity for scheduling the service data, a codeword of the service data, and at least one of a radio frame number, a radio subframe number, and a radio timeslot number that are used for scheduling the service data.

The processor 902 is further configured to generate the scrambling sequence according to the MBSFN area identity, the codeword of the service data, the service characteristic, and at least one of the radio frame number, the radio subframe number, and the radio timeslot number.

Preferably, the scrambling parameter may further include a service data transmission mode, and the processor 902 is further configured to determine whether the service data is unicast data or multicast data.

The processor 902 is further configured to set the transmission mode to either 0 or 1 when the service data is unicast data.

The processor 902 is further configured to set the transmission mode to the other of the 0 or 1 when the service data is multicast data.

Preferably, the transmitter 904 is configured to send the scrambling parameter to user equipment UE used to receive the service data.

The transmitter 904 is further configured to send the service data to the UE, so that the UE generates a descrambling sequence according to the scrambling parameter after receiving the scrambling parameter, and the UE descrambles the scrambled service data according to the descrambling sequence after receiving the scrambled service data.

In conclusion, according to the service data scrambling apparatus provided in this embodiment of the present invention, a scrambling sequence is generated by using a service characteristic corresponding to service data, an MBSFN area identity, a radio timeslot number, and the like as scrambling parameters, and the service data is scrambled according to the generated scrambling sequence; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same service area, and achieving an effect that interference between different service data sent simultaneously in the same service area can be reduced to a great extent.

Embodiment 7

Figure 10:
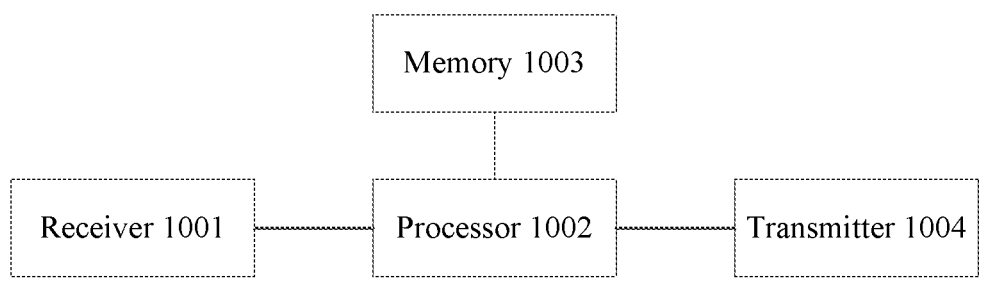
FIG. 10 is a schematic structural diagram of a service data descrambling apparatus according to Embodiment 7 of the present invention.

Referring to FIG. 10, FIG. 10 shows a schematic structural diagram of a service data descrambling apparatus according to Embodiment 7 of the present invention. The service data descrambling apparatus may be implemented as a UE or implemented as a part of the UE. The service data descrambling apparatus may include: a receiver 1001, a processor 1002, a memory 1003, and a transmitter 1004, where the memory 1003 stores one or more pieces of computer software, and the processor 1002 may perform corresponding operations according to the computer software.

The receiver 1001 is configured to acquire a descrambling parameter, where the descrambling parameter is a scrambling parameter sent by an evolved NodeB eNodeB or a part of the scrambling parameter.

The processor 1002 is configured to generate a descrambling sequence according to the descrambling parameter.

The receiver 1001 is further configured to acquire scrambled service data, where the scrambled service data is service data obtained by scrambling according to a scrambling sequence, where the scrambling sequence is generated according to the scrambling parameter and the eNodeB uses a service characteristic corresponding to received service data as the part of the scrambling parameter.

The processor 1002 is further configured to descramble the received service data according to the descrambling sequence.

Preferably, the receiver 1001 is further configured to receive the scrambling parameter sent by the eNodeB or the part of the scrambling parameter, and the processor 1002 is further configured to use the scrambling parameter received by the receiver or the part of the scrambling parameter as a descrambling parameter.

Preferably, the receiver 1001 is further configured to receive the service data sent by the eNodeB.

In conclusion, according to the service data descrambling apparatus provided in this embodiment of the present invention, a scrambling parameter used for scrambling service data is received, and a descrambling sequence is generated according to the scrambling parameter; after the service data is received, the service data is descrambled according to the descrambling sequence, and then a process of descrambling the scrambled service data is complete.

Embodiment 8

Figure 11:
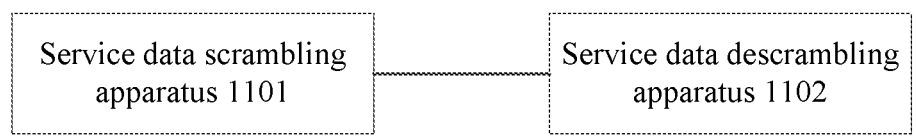
FIG. 11 is a schematic structural diagram of a service data transmission system according to Embodiment 8 of the present invention.

Referring to FIG. 11, FIG. 11 shows a schematic structural diagram of a service data transmission system according to Embodiment 8 of the present invention. The system includes at least one service data scrambling apparatus 1101 and at least one service data descrambling apparatus 1102. The service data scrambling apparatus 1101 may be the service data scrambling apparatus provided in Embodiment 4, and the service data descrambling apparatus 1102 may be the service data descrambling apparatus provided in Embodiment 5. Alternatively, the service data scrambling apparatus 1101 may be the service data scrambling apparatus provided in Embodiment 6, and the service data descrambling apparatus 1102 may be the service data descrambling apparatus provided in Embodiment 7.

In conclusion, according to the service data scrambling system provided in this embodiment of the present invention, a scrambling sequence is generated by using a service characteristic corresponding to service data, an MBSFN area identity, a radio timeslot number, and the like as scrambling parameters, and the service data is scrambled according to the generated scrambling sequence; correspondingly, the scrambling parameter used for scrambling the service data is received, a descrambling sequence is generated according to the scrambling parameter, and the service data is descrambled according to the descrambling sequence after the service data is received; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same service area, and achieving an effect that interference between different service data sent simultaneously in the same service area can be reduced to a great extent.

Embodiment 9

Figure 12:
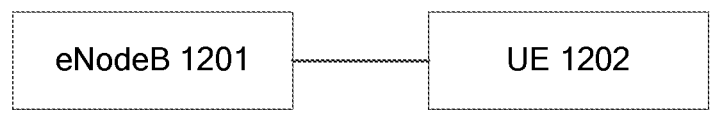
FIG. 12 is a schematic structural diagram of a service data transmission system according to Embodiment 9 of the present invention.

Referring to FIG. 12, FIG. 12 shows a schematic structural diagram of a service data transmission system according to Embodiment 9 of the present invention. The system includes at least one eNodeB 1201 and at least one UE 1202. The eNodeB 1201 may include the service data scrambling apparatus provided in Embodiment 4, and the UE 1202 may include the service data descrambling apparatus provided in Embodiment 5. Alternatively, the eNodeB 1201 may include the service data scrambling apparatus provided in Embodiment 6, and the UE 1202 may include the service data descrambling apparatus provided in Embodiment 7.

In conclusion, according to the service data scrambling system provided in this embodiment of the present invention, a scrambling sequence is generated by using a service characteristic corresponding to service data, an MBSFN area identity, a radio timeslot number, and the like as scrambling parameters, and the service data is scrambled according to the generated scrambling sequence; correspondingly, the scrambling parameter used for scrambling the service data is received, a descrambling sequence is generated according to the scrambling parameter, and the service data is descrambled according to the descrambling sequence after the service data is received; because the service characteristic corresponding to the service data is added to the scrambling sequence of each piece of service data, scrambling sequences generated for different service data are different, thereby resolving a problem that relatively great interference is generated when multiple pieces of different service data are simultaneously transmitted in a same service area, and achieving an effect that interference between different service data sent simultaneously in the same service area can be reduced to a great extent.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A service data scrambling apparatus comprising:
   a receiver configured to receive multicast broadcast service data;
   a processor configured to:
   identify a service characteristic corresponding to the service data received by the receiver as a part of a scrambling parameter used to generate a scrambling sequence, wherein the scrambling parameter includes a transmission mode and a multimedia broadcast single frequency network (MBSFN) area identity used for scheduling the service data;
   generate the scrambling sequence according to the identified scrambling parameter;
   scramble the service data according to the scrambling sequence; and
   a transmitter configured to send the scrambled service data.

2. The apparatus according to claim 1, wherein the service characteristic comprises at least one of the following characteristics:
   a service identity of a multicast broadcast service corresponding to the service data;
   a public land mobile network identity to which the multicast broadcast service belongs;
   a mobile group identity or a temporary mobile group identity that corresponds to the multicast broadcast service; and
   a scheduling group radio network temporary identifier corresponding to the multicast broadcast service.

3. The apparatus according to claim 2, wherein:
   the scrambling parameter further comprises at least one of a radio frame number, a radio subframe number, and a radio timeslot number that are used for scheduling the service data; and
   the processor is further configured to generate the scrambling sequence according to the MBSFN area identity, the service characteristic corresponding to the service data received by the receiver, and at least one of the radio frame number, the radio subframe number, and the radio timeslot number;
   or wherein:
   the scrambling parameter further comprises a codeword of the service data, and at least one of the radio frame number, the radio subframe number, and the radio timeslot number that are used for scheduling the service data; and
   the processor is further configured to generate the scrambling sequence according to the MBSFN area identity, the codeword of the service data, the service characteristic corresponding to the service data received by the receiver, and at least one of the radio frame number, the radio subframe number, and the radio timeslot number.

4. The apparatus according to claim 2, wherein:
   the scrambling parameter further comprises a radio frame number, a radio subframe number, and a radio timeslot number that are used for scheduling the service data; and
   the processor is further configured to generate the scrambling sequence according to the MBSFN area identity, the service characteristic corresponding to the service data received by the receiver, the radio frame number, the radio subframe number, and the radio timeslot number;
   or wherein:
   the scrambling parameter further comprises a codeword of the service data, the radio frame number, the radio subframe number, and the radio timeslot number that are used for scheduling the service data; and
   the processor is further configured to generate the scrambling sequence according to the MBSFN area identity, the codeword of the service data, the service characteristic corresponding to the service data received by the receiver, the radio frame number, the radio subframe number, and the radio timeslot number.

5. The apparatus according to claim 1, wherein:
the processor is further configured to:
determine whether the service data received by the receiver is unicast data or multicast data;
set the transmission mode to either 0 or 1 when the service data is unicast data; and
set the transmission mode to the other of the 0 or 1 when the service data is multicast data.

6. The apparatus according to claim 1, wherein the transmitter is further configured to:
send the scrambling parameter or the part of the scrambling parameter to user equipment (UE) used to receive the service data, so that the UE acquires a descrambling parameter according to the received scrambling parameter or the received part of the scrambling parameter and the UE generates a descrambling sequence according to the descrambling parameter; and
send the scrambled service data to the UE, so that the UE descrambles the scrambled service data according to the descrambling sequence after receiving the scrambled service data.

7. A service data transmission system, wherein the system comprises at least one service data scrambling apparatus according to claim 1, and a service data descrambling apparatus, wherein the service data descrambling apparatus comprises:
a receiver configured to acquire a descrambling parameter, wherein the descrambling parameter is the scrambling parameter sent by an eNodeB or a part of the scrambling parameter;
the processor is configured to:
generate a descrambling sequence according to the descrambling parameter;
acquire scrambled service data, wherein the scrambled service data is service data obtained by scrambling according to the scrambling sequence, wherein the scrambling sequence is generated according to the scrambling parameter and the eNodeB uses the service characteristic corresponding to received service data as the part of the scrambling parameter; and
descramble the acquired service data according to the descrambling sequence.

8. A service data descrambling apparatus comprising:
a receiver configured to acquire a descrambling parameter, wherein the descrambling parameter is a scrambling parameter sent by an eNodeB or a part of the scrambling parameter, and wherein the scrambling parameter includes a transmission mode and a multimedia broadcast single frequency network (MBSFN) area identity;
a processor configured to:
generate a descrambling sequence according to the descrambling parameter;
acquire scrambled service data, wherein the scrambled service data is service data obtained by scrambling according to a scrambling sequence, wherein the scrambling sequence is generated according to the scrambling parameter and the eNodeB uses a service characteristic corresponding to received service data as the part of the scrambling parameter, and
descramble the acquired service data according to the descrambling sequence.

9. The apparatus according to claim 8, wherein
the receiver is further configured to receive the scrambling parameter sent by the eNodeB or the part of the scrambling parameter sent by the eNodeB;
the processor is further configured to identify the scrambling parameter received by the receiver or the part of the scrambling parameter as the descrambling parameter;
the receiver is further configured to receive the scrambled service data sent by the eNodeB; and
the processor is further configured to descramble the received scrambled service data using the descrambling parameter.

* * * * *